United States Patent [19]

Rochelmeyer

[11] Patent Number: 4,748,729
[45] Date of Patent: Jun. 7, 1988

[54] MOUNTING A ROLLER IN A STRAIGHTENING MACHINE

[75] Inventor: Kurt Rochelmeyer, Spiesen, Fed. Rep. of Germany

[73] Assignee: Mannesmann AG, Duesseldorf, Fed. Rep. of Germany

[21] Appl. No.: 3,808

[22] Filed: Jan. 16, 1987

[30] Foreign Application Priority Data

Jan. 31, 1986 [DE] Fed. Rep. of Germany ....... 3603371

[51] Int. Cl.[4] ............................................. B21B 25/02
[52] U.S. Cl. ........................................ 29/123; 29/125; 29/130; 72/238
[58] Field of Search .................... 29/123, 125, 130; 72/238, 199

[56] References Cited

U.S. PATENT DOCUMENTS 3,985,013 10/1976 Pillon et al. ......................... 72/238

FOREIGN PATENT DOCUMENTS 2439329 3/1976 Fed. Rep. of Germany .
0076953 7/1978 Japan .................................. 29/125
152212 4/1932 Switzerland ......................... 29/123
4596 2/1908 United Kingdom ................. 29/123

Primary Examiner—Mark Rosenbaum
Assistant Examiner—Frances Chin
Attorney, Agent, or Firm—Ralf H. Siegemund

[57] ABSTRACT

The roller is held on a mounting sleeve through axially and radially biased spacer sleeves and conical elements; the mounting sleeve has an internal conical surface clamped against a conical surface of the drive pin, clamping being achieved by a hydraulic clamping head coaxially with a tie rod, and the tension of the tie rod is maintained by a bayonet lock locking the clamping head to the mounting sleeve.

5 Claims, 1 Drawing Sheet

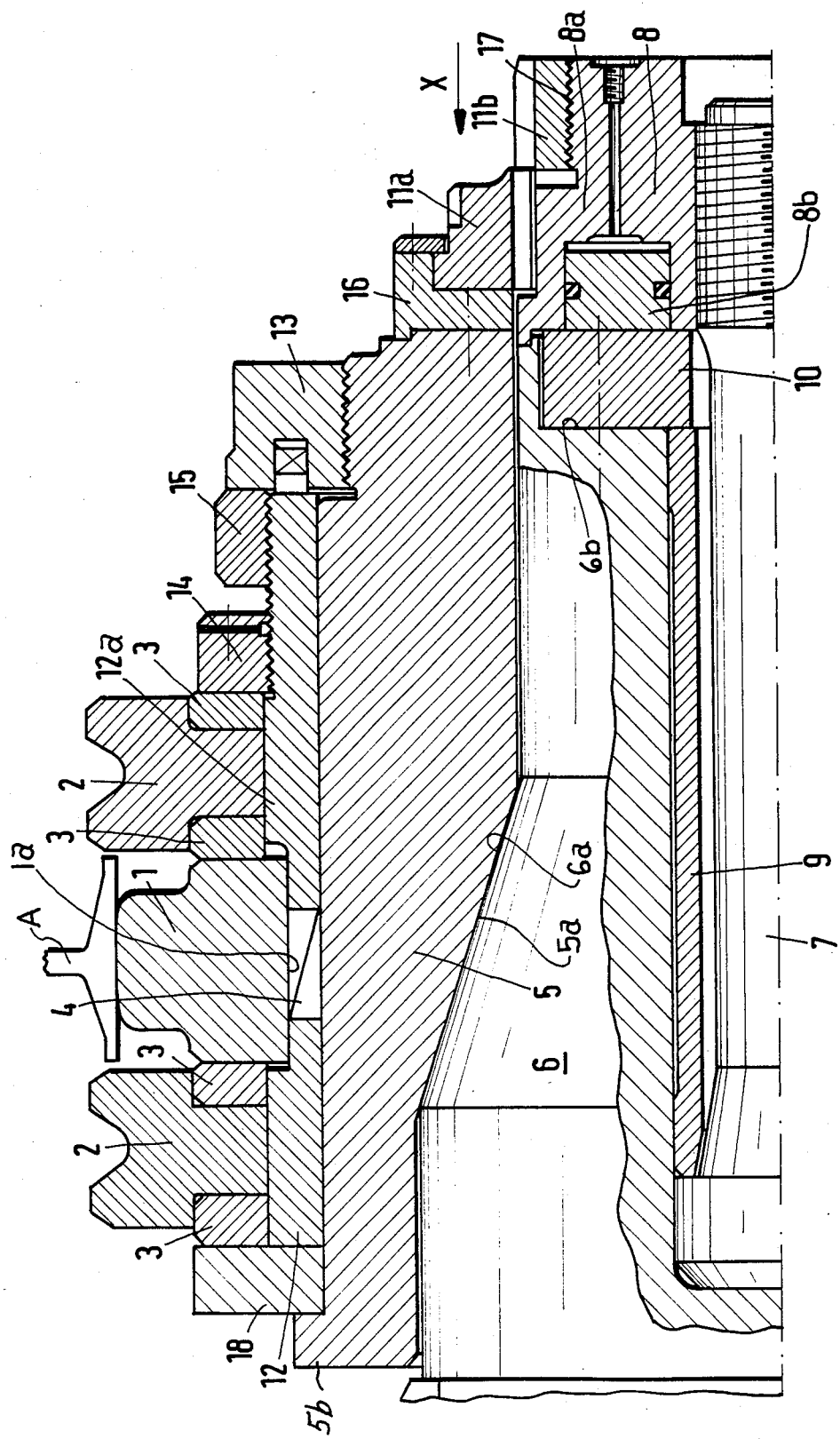

MOUNTING A ROLLER IN A STRAIGHTENING MACHINE

BACKGROUND OF THE INVENTION

The present invention relates to the fastening of rollers in a straightening machine wherein a hydraulically actuated clamping head is provided at the free end of a rotatable roller shaft which head is connected to a tie rod being arranged in a central bore of the roller shaft and bearing against it; moreover an annular piston of the clamping head bears against the front face of the roller shaft, and a sleeve for mounting the straightening roller on the shaft can be clamped against the collar of that shaft by means of a bayonet ring cooperating with the clamping head. That sleeve itself is mounted on a pin.

German Pat. No. 24 39 329 describes such a fastening structure for rollers whereby particularly the clamping head is provided with an annular piston, bearing and forcing against the front face of the roller shaft. A bayonet ring is connected, as stated, to that clamping head and by means of that ring the mounting sleeve for the straightening rollers can be forced against a collar of the shaft to thereby permit clamping of the roller itself.

From an overall point of view this kind of an arrangement is disadvantaged by the fact that an unforeseeable slack or play may occur between the journal pin and the roller mounting sleeve. Moreover the overall assembly and disassembly of this known arrangement is rather time consuming.

DESCRIPTION OF THE INVENTION

It is an object of the present invention to improve roller fastening of the type mentioned in the introduction such that the connection between the pin and the roller mounting sleeve is made and ensured without play and that also the time needed for any roller change is considerably shortened.

In accordance with the preferred embodiment of the present invention it is suggested to provide the carrying pin with a tapering conical periphery, at least over a part of its axial length, the tapering reducing the pin diameter toward a clamping head. This tapering surface cooperates with a corresponding and matching conical internal surface of a roller mounting sleeve such that these conical surfaces can be forced against each other by means of a clamping head itself and a tie rod. The clamping head cuts initially like a piston/cylinder drive to bias the tie rod and clamping the sleeve to the pin. The head is the locked e.g. by a bayonet lock and the hydraulic is removed.

A clamping nut is preferably provided on the roller mounting sleeve for fastening the straightening roller itself against a collar element on the sleeve. The roller mounting sleeve carries preferably two spacer sleeves supporting the straightening roller while in between them and particularly between the straightening roller itself and the roller mounting sleeve conical clamping elements are provided which in the case of any axial movement upon tensioning, establish tension vis-a-vis the roller mounting sleeve. In addition, straightening disks are provided to both sides of the roller which can be forced through annular spacer against the straightening roller by means of the clamping nut.

Owing to the conical interfaces of the pin and the roller supporting sleeve any play between that sleeve and the roller pin can be eliminated. Moreover, the straightening roller itself will be radially clamped to its mounting sleeve which was found to have a very positive effect on the straightening operation. From an overall point of view the inventive clamping device makes possible very short periods of the time roller exchange owing to a easily manageable structure for the roller and its mounting structure; these aspects will be considered in detail below.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates a partial cross section through a roller fastening structure constructed in accordance with the preferred embodiment of the present invention for practicing the best mode thereof.

Proceeding to the detailed description of the drawings the FIGURE shows a straightening roller 1 of annular construction with a radially inwardly oriented seating and mounting surface 1a. The roller is shown in operating engagement with a part A to be straightened. This roller 1 is driven by a hollow pin 6 being connected to a suitable drive. The connect and mounting structure for the roller constitutes the inventive structure.

A roller mounting sleeve 5 is fastened to the straightening pin 6 by means of a clamping head 8. The clamping head 8 is arranged at the free end of a tie rod 7. The tie rod 7 is held in a central blind bore in pin 6 and in the particular illustrated example a spacer sleeve 9 is provided as well as a flange collar or annulus 10 being bolted to the front face 6b of the pin 6.

An annular piston chamber 8a is provided in the clamping head 8 acting on annular piston 8b which bears against the annular bearing 10 which in turn acts on front face of the pin 6b. The end of clamping head 8 facing away from the pin 6 is provided with an outer threading 17 and a bayonet ring 11b is treaded onto that threading 17. This bayonet 11b together with a ring 11a establish a bayonet lock. The ring 11a is urged and held against the sleeve 5 by means of a holder 16.

Reference numeral 5a refers to a conical surface portion in the interior of sleeve 5 and reference numeral 6a refers to a matching and mating, conical or frustoconical surface being a transition between two cylindrical parts of the pin 6. The parts are of different diameter accordingly and the small diameter portion of the pin 6 extending towards the head 8 ends in the front face 6b against which the flange 10 bears.

The FIGURE shows also that two disks 2 are provided on both sides of the roller 1 which are clamped axially to the roller 1, particularly the collar 18 abutting flange 5b, through inserts 3 and a nut 14. These disks 2 guide the stock to be straightened in an axial direction. Two radial spacer sleeves 12 and 12a are mounted on the sleeve 5. Two conical tension elements 4 space them axially. Sleeve 5 has a threaded extension to which is threaded a tensioning and clamping nut 13. That nut 13 bears against spacer 12a and biases it axially. Nut 13 is held in position by a counter and locking nut 15 threaded onto spacer sleeve 12a. The spacer sleeve 12 is held against that collar 18, and the roller 1 sits on both sleeves 12, 12a as well as on the tensioning elements 4.

Fastening and release of the sleeve 5 is carried out as follows. An electrohydraulic pump of mobile configuration (not shown) is placed in front of the shaft. The pump is coupled through a rapid connect coupling as well as a hose to a duct in the clamping head 8. Upon turning on of the motor pressure builds up in the hose and on the basis of this pressure a valve (not shown) with connecting nipple is lifted so that oil can flow into the annular cylinder 8a. The piston 8b now bears against the flange, ring or annulus 10 which in turn acts on the front face 6b of pin 6. Accordingly the tie rod 7 will be tensioned because the piston 8b tends to move the head 8 axially away from the pin 6. One has to wait until rated pressure has built up by the pump whereupon the motor for the pump can be turned off. As soon as the pressure in the clamping head 8 as well as in the hose and the connection have equalized the valve owing to a larger spring force in the valve body will cause the valve in rapid connection to close. Now the coupling and hydraulic equipment can be separated but for this it is usually required that the pressure in the hose, through valve operation at the hydraulic pump, is reduced. After tensioning of the tie rod 7 the bayonet lock 11a, b will be closed and locked through turning of the bayonet ring 11b. This means that the play between the bayonet rings will be reduced to zero through turning of the ring 11b on the clamping head 8. Thus, even though hydraulic pressure will be taken away later, the clamping head 8 maintains the tension bias in the tie rod 7 by means of the banonet lock and that in turn provides the force of axially urging the sleeve 5 onto the pin 6 by operation of the conical surfaces 5a and 6a.

The straightening roller machine to which the illustrated roller pertains and will be mounted on a drive pin (6) which has of course other such rollers and they are mounted on drive pins analogously. After all tie rods in the several mounts have been tension biased in this fashion and after all bayonet connections have locked and have no play the hydarulic pressure is reduced and this means that the biased tension of the tie rods is now acted upon the respective roller mounting sleeves!

From the foregoing one can see that the conical surfaces 5a and 6a upon tensioning by means of the tension head on the tie rod avoid any and all play between these parts. The clamping nut 14 being arranged on the spacer sleeve 12 tensions the straightening roller 1 against the collar 18 on the sleeve 5. The sleeve 12a is axially tensioned by nut 13 and counter nut 15 locks the nut 13 in position once the requisite tension is achieved. Underneath the roller 1 and between the lower and internal surface 1a of the roller, and the sleeve 5 two conical tension elements 4 are provided as stated and one can see from the drawing that upon tensioning i.e. whenever the two spacer sleeves 12 are moved towards each other in axial direction a radial force acts against the roller 1 from the inside and, therefore, the roller 1 is radially tensioned against the sleeve 5.

The invention is not limited to the embodiments described above but all changes and modifications thereof, not constituting departures from the spirit and scope of the invention, are intended to be included.

What is claimed is:

1. In a straightening machine, a fastening structure, for fastening an annular straightening roller onto a drive pin, there being a clamping head for a tie rod in the pin, the clamping head including a cylinder piston arrangement to obtain the tensioning to be maintained by a ring lock structure, the improvement comprising:

the pin having a conical surface over at least a portion of its extension;

a roller mounting sleeve on the pin and having an internal conical surface in mating configuration to the conical surface portion of the pin;

the clamping head including a lock and being provided and constructed for forcing the sleeve's conical surface onto the conical surface portion of the pin by operation of the tie rod; and means for mounting the roller onto the sleeve.

2. The improvement as in claim 1, including axial clamping means including clamping nut means and a collar element on the mounting sleeve for axially clamping the roller onto the sleeve.

3. The improvement as in claim 2, there being spacer sleeves interposed between the roller and the sleeve.

4. The improvement as in claim 3, there being conical clamping elements interposed radially between the roller and the mounting sleeve and axially between the spacer sleeves to clamp the roller onto the mounting sleeve upon tightening said nut means.

5. The improvement as in claim 2, there being disks placed axially on both sides of the roller and held against the roller by the clamping nut means and the collar element.

* * * * *